US009095021B2

(12) United States Patent
Seider

(10) Patent No.: US 9,095,021 B2
(45) Date of Patent: Jul. 28, 2015

(54) CIRCUIT ARRANGEMENT FOR OPERATING AT LEAST A FIRST AND A SECOND CASCADE OF LEDS

(71) Applicant: Osram GmbH, Munich (DE)

(72) Inventor: Andreas Seider, Schwindegg (DE)

(73) Assignee: Osram GmbH, Munich (DE)

( * ) Notice: Subject to any disclaimer, the term of this patent is extended or adjusted under 35 U.S.C. 154(b) by 263 days.

(21) Appl. No.: 13/886,401

(22) Filed: May 3, 2013

(65) Prior Publication Data

US 2013/0293129 A1 Nov. 7, 2013

(30) Foreign Application Priority Data

May 4, 2012 (DE) .......................... 10 2012 207 454
Jan. 29, 2013 (DE) .......................... 10 2013 201 439

(51) Int. Cl.
*H05B 37/00* (2006.01)
*H05B 39/00* (2006.01)
*H05B 41/00* (2006.01)
*H05B 33/08* (2006.01)

(52) U.S. Cl.
CPC .......... *H05B 33/0812* (2013.01); *H05B 33/083* (2013.01); *Y02B 20/343* (2013.01)

(58) Field of Classification Search
CPC ....... B23K 11/248; B60L 1/14; B61L 5/1881; F21V 23/04; G05F 1/14
USPC ............................... 315/193, 186, 122, 185 R
See application file for complete search history.

(56) References Cited

U.S. PATENT DOCUMENTS

| 4,298,869 | A | 11/1981 | Okuno |
| 7,986,107 | B2 | 7/2011 | Weaver et al. |
| 8,471,495 | B2 * | 6/2013 | Muguruma et al. ........... 315/299 |
| 8,638,038 | B2 * | 1/2014 | Ge et al. .................... 315/185 R |
| 2009/0179575 | A1 | 7/2009 | Mednik et al. |
| 2009/0230883 | A1 | 9/2009 | Haug |
| 2010/0134018 | A1 * | 6/2010 | Tziony et al. ................. 315/122 |
| 2010/0181923 | A1 | 7/2010 | Hoogzaad |
| 2010/0308739 | A1 | 12/2010 | Shteynberg et al. |
| 2011/0127919 | A1 | 6/2011 | Lin |
| 2011/0210670 | A1 | 9/2011 | Sauerlander et al. |
| 2011/0210674 | A1 | 9/2011 | Melanson |
| 2011/0227489 | A1 | 9/2011 | Huynh |

(Continued)

FOREIGN PATENT DOCUMENTS

| DE | 2925692 A1 | 1/1980 |
| DE | 102010040266 A1 | 9/2011 |

(Continued)

*Primary Examiner* — Quan Tra

(57) ABSTRACT

A circuit arrangement for operating at least a first and a second cascade of LEDs is provided. The LED cascades have a different number of LEDs, which are operated alternately in a manner adapted to the instantaneous value of the rectified AC supply voltage by a suitable drive logic. The cascades are assigned to LED units, wherein each unit includes a driving device for driving the respective cascade. The units are coupled in series between the two input terminals, wherein the input terminals are formed by the output of a rectifier. A linear regulator is provided in series with the cascades, said linear regulator being driven via a voltage divider coupled between the two input terminals. An auxiliary voltage supply is provided for operating the respective driving devices, wherein the auxiliary voltage is generated from the voltage dropped across the linear regulator during the operation of the circuit arrangement.

16 Claims, 3 Drawing Sheets

(56) References Cited

U.S. PATENT DOCUMENTS

2011/0248640 A1 10/2011 Welten
2013/0187551 A1* 7/2013 Choy et al. .................... 315/122
2013/0200801 A1* 8/2013 Fratti ............................ 315/122

FOREIGN PATENT DOCUMENTS

| WO | 2011070482 | A2 | 6/2011 |
| WO | 2012034102 | A1 | 3/2012 |

* cited by examiner

US 9,095,021 B2

CIRCUIT ARRANGEMENT FOR OPERATING AT LEAST A FIRST AND A SECOND CASCADE OF LEDS

CROSS-REFERENCE TO RELATED APPLICATION

This application claims priority to German Patent Application Serial No. 10 2012 207 454.6, which was filed May 4, 2012, and to German Patent Application Serial No. 10 2013 201 439.2, which was filed Jan. 29, 2013, and is incorporated herein by reference in its entirety.

TECHNICAL FIELD

Various embodiments relate to a circuit arrangement for operating at least a first and a second cascade of LEDs including an input having a first and a second input terminal for coupling to a rectified AC supply voltage, a linear regulator having an input, and also a first higher and a second lower LED unit, wherein the first LED unit includes the first cascade of LEDs and the second LED unit includes the second cascade of LEDs.

BACKGROUND

A circuit arrangement of the generic type is known from DE 29 25 692 A1. In that case, it is known to feed cascades of LEDs, each including a multiplicity of LEDs, from an AC voltage power supply system via a rectifier. However, this leads to a high degree of light modulation, so-called "flicker", and energy-inefficient utilization of the LEDs. For higher power classes, this approach furthermore leads to problems with normative stipulations with regard to power factor and harmonics.

SUMMARY

A circuit arrangement for operating at least a first and a second cascade of LEDs is provided. The LED cascades have a different number of LEDs, which are operated alternately in a manner adapted to the instantaneous value of the rectified AC supply voltage by a suitable drive logic. The cascades are assigned to LED units, wherein each unit includes a driving device for driving the respective cascade. The units are coupled in series between the two input terminals, wherein the input terminals are formed by the output of a rectifier. A linear regulator is provided in series with the cascades, said linear regulator being driven via a voltage divider coupled between the two input terminals. An auxiliary voltage supply is provided for operating the respective driving devices, wherein the auxiliary voltage is generated from the voltage dropped across the linear regulator during the operation of the circuit arrangement.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
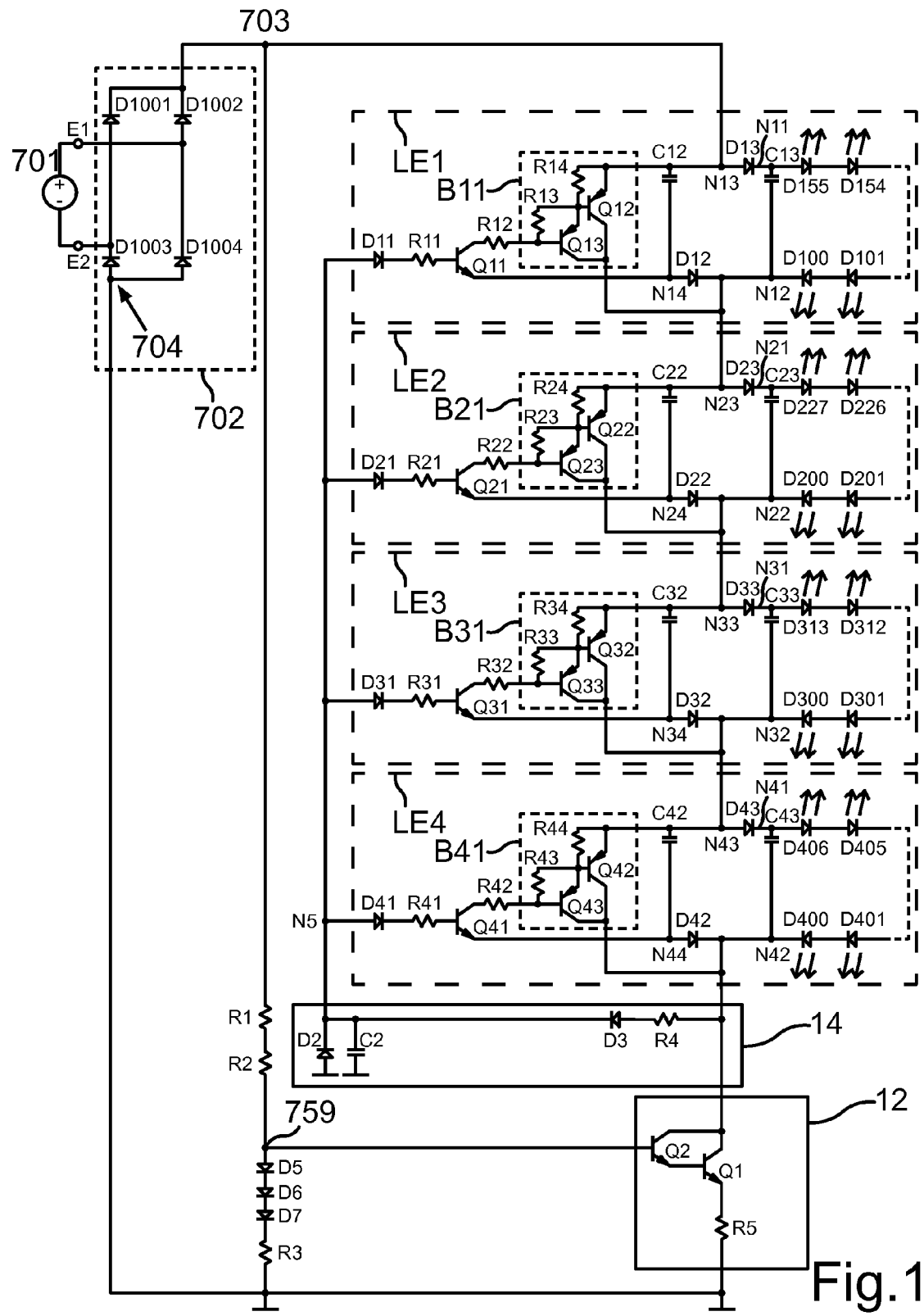
FIG. 1 shows in schematic illustration a first exemplary embodiment of a circuit arrangement in accordance with various embodiments.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments develop a circuit arrangement of the generic type for operating at least a first cascade and a second cascade of light emitting diodes (LEDs) in such a way that more efficient operation of the LEDs is made possible.

Various embodiments may be based on the insight that the effectiveness and hence the efficiency of a circuit arrangement of the generic type can be increased and the stipulations with regard to the power factor can be fulfilled if a voltage divider is provided, which is coupled between the first and the second input terminals, wherein the tap of the voltage divider is coupled to the input of a linear regulator coupled in series with the LED cascades. By virtue of this measure, a current consumption of the circuit arrangement can be made dependent on the respective phase angle of the rectified AC supply voltage.

Each LED unit includes a first diode, which is coupled in series with the respective LED cascade, wherein said first diode serves as a blocking diode. The coupling point of the first diode and of the respective LED cascade constitutes a first node, wherein that terminal of the LED cascade which is not coupled to the first diode constitutes a second node, wherein that terminal of the first diode which is not coupled to the LED cascade constitutes a third node. Each LED unit furthermore has the series circuit formed by a first capacitor and a second diode, which is coupled between the third node and the second node, wherein the coupling point of the first capacitor to the second diode constitutes a fourth node. Each LED unit furthermore has a first and a second electronic switch each having a control electrode, a reference electrode and an operating electrode, wherein the control electrode of the first electronic switch is coupled to a fifth node, wherein the reference electrode of the first electronic switch is coupled to the fourth node, wherein the operating electrode of the first electronic switch is coupled to the control electrode of the second electronic switch, wherein the reference electrode of the second electronic switch is coupled to the third node, wherein the operating electrode of the second electronic switch is coupled to the second node. As explained in even greater detail further below, in this way it is possible to create the prerequisite for switching the different LED cascades on or off depending on the instantaneous value of the rectified AC supply voltage. In this case, only individual LED cascades or else a plurality of LED cascades simultaneously can be in operation. For this purpose, the third node of the highest LED unit is coupled to the first input terminal, wherein the second node of the lowest LED unit is coupled to the linear regulator in such a way that the linear regulator is coupled in series between the second node of the lowest LED unit and the second input terminal. The third node of a respective LED unit which does not constitute the highest LED unit is coupled to the second node of the next higher LED unit.

Since the respective first electronic switch is switched by variation of the potential at the reference electrode, a suitably chosen DC voltage is to be applied to its control electrode. According to various embodiments, therefore, the fifth nodes of all the LED units are coupled to a DC voltage source.

In order to enable a particularly high efficiency of a circuit arrangement according to various embodiments, the DC voltage source is realized by virtue of the fact that the AC voltage occurring at the second node of the lowest LED unit during the operation of the circuit arrangement is used for generating a DC voltage. In this way, it is not necessary to provide a separate auxiliary voltage for generating the potential at the fifth node, for example using a buck converter coupled to the rectifier output; rather, in the present case a particularly skillfully chosen AC voltage signal is utilized within the circuit arrangement. Specifically, as has been recognized, the AC voltage occurring at the second node of the lowest LED unit is particularly suitable since it is present independently of the instantaneous value of the AC supply voltage virtually continuously at the second node and is thus available permanently, that is to say likewise independently of the instantaneous value of the AC supply voltage, for supplying the fifth node. The auxiliary voltage generated in the present case has only little residual ripple, for which reason very small capacitances can be used in comparison with other auxiliary voltage supplies. It is constructed very simply and can be realized in a compact fashion. Moreover, it is also cost-effective for this reason. The fact that a current which otherwise would have been converted into power loss in the linear regulator is drawn for the auxiliary voltage supply is particularly advantageous. Consequently, the auxiliary voltage supply does not give rise to additional power loss, as a result of which the efficiency of the circuit arrangement is optimized. This results not only in low costs of a circuit arrangement according to the invention, but also in a small structural size.

In various embodiments, each LED unit furthermore includes a second capacitor, which is connected in parallel with the respective LED cascade. In this way, the LEDs of the respective LED cascade can be supplied from the respective second capacitor in the phases in which the LEDs of the respective cascade are not supplied directly from the rectified AC supply voltage, be it because the rectified AC supply voltage is lower than the sum of the forward voltages of the respective LED cascade, or be it because another LED cascade is active and the relevant LED cascade is precisely short-circuited. This results in a reduction of the light modulation, such that flicker phenomena are scarcely perceptible any more to the human eye.

In various embodiments, each LED unit furthermore includes a third diode, which is coupled between the fifth node and the control electrode of the respective first electronic switch. Said third diode serves to protect the control electrode of the respective first electronic switch. In the case where the first electronic switch is designed with correspondingly high dielectric strength, these third diodes can be omitted.

In various embodiments, the DC voltage source includes a charge pump, the input of which is coupled to the second node of the lowest LED unit and the output of which is coupled to the fifth node of all the LED units. Through the use of a charge pump, a DC voltage for supplying the fifth node of all the LED units can be obtained in a particularly simple manner from the AC voltage occurring at the second node of the lowest LED unit. The charge pump preferably includes the series circuit formed by a half-wave rectifier and a voltage limiting device. This makes it possible to provide a voltage supply for the fifth node which is reliably above a predefinable threshold value. This measure makes it possible to provide particularly low ripple of the auxiliary voltage.

In various embodiments, the DC voltage source includes the series circuit formed by a resistor and a fourth diode, which is coupled between the second node of the lowest LED unit and the fifth nodes of all the LED units, and the parallel circuit formed by a third capacitor and a zener diode, which is coupled between the fifth nodes of all the LED units and the second input terminal.

In this context, the resistor connected in series with the fourth diode can be embodied as a fixed ohmic resistor. This is e.g. provided when the circuit arrangement need not be embodied in a dimmable fashion. However, if a dimming possibility is intended to be provided, the resistor connected in series with the fourth diode is embodied as a variable resistor, in order to realize a regulating device of the charge pump. In this case, it may be provided if said regulating device of the charge pump is designed to regulate the voltage at the fifth node to a predefinable value. This takes account of the fact that the voltage dropped across the series regulator, that is to say in the present case the voltage at the second node of the lowest LED unit, in the case of phase-gating or phase-chopping dimming, corresponds to an asymmetrical sawtooth signal having outliers. The provision of a regulating device in the charge pump ensures that in this case, too, the third capacitor is supplied with enough current to provide a substantially constant predefinable voltage at the fifth node of all the LED units.

In various embodiments, the regulating device of the charge pump is embodied as an inverting voltage regulator. In this case, the voltage regulator has a third and a fourth electronic switch each having a control electrode, an operating electrode and a reference electrode, wherein the control electrode of the third electronic switch is coupled to the anode of the zener diode, its reference electrode is coupled to the second input terminal and its operating electrode is coupled to the control electrode of the fourth electronic switch, wherein the control electrode of the fourth electronic switch is furthermore coupled via an ohmic resistor to its operating electrode, which, for its part, is coupled to the cathode of the fourth diode, wherein the reference electrode of the fourth electronic switch is coupled to the fifth node of all the LED units. In this configuration, the third electronic switch measures the current through the zener diode. If no current flow through the zener diode can be ascertained, the voltage at the third capacitor is accordingly too low. Owing to the lack of a current flow through the zener diode, the third electronic switch becomes non-conducting and, in a reciprocal fashion, on account of the ohmic resistor acting as a pull-up resistor between the operating electrode and the control electrode of the fourth electronic switch, the latter is switched on. A current flow from the second node of the lowest LED unit to the third capacitor and thus to the fifth node of all the LED units is made possible in this way.

In various embodiments, a capacitor is coupled between the control electrodes of the third and of the fourth electronic switch, on the one hand, and the second input terminal, on the other hand. Said capacitor serves to filter out jumps, spikes and the like and therefore makes the arrangement less sensitive to interference.

In various embodiments, the LED units each include a different number of LEDs. In principle, this affords the possibility of carrying out an adaptation of the LED string voltage to the instantaneous value of the rectified AC supply voltage.

In various embodiments, in this case each higher LED unit includes double the number of LEDs compared with the next lower LED unit. A particularly uniform adaptation to the rectified DC supply voltage can be carried out in this way.

A regulating device for regulating the current through the linear regulator can be furthermore provided, wherein the input of the regulating device is coupled to the fifth node and the output of the regulating device is coupled to the input of the linear regulator. Such a regulating device makes it possible, for example, to regulate the current through the at least one LED unit in a manner dependent on the temperature.

In various embodiments, such a regulating device includes a fifth electronic switch having a control electrode, a reference electrode and an operating electrode; and a voltage divider having at least one ohmic resistor and an NTC thermistor, wherein the voltage divider is coupled between the fifth node and the second input terminal; wherein the tap of the voltage divider is coupled to the control electrode of the fifth electronic switch, wherein the reference electrode of the fifth electronic switch is coupled to the second input terminal, wherein the operating electrode of the fifth electronic switch is coupled to the input of the linear regulator. Upon heating of the circuit arrangement, the voltage at the control electrode of the third electronic switch accordingly increases, as a result of which said third electronic switch is increasingly switched on. This has the effect that, in a reciprocal fashion, the voltage at the input of the linear regulator correspondingly decreases. In this way, the current through the linear regulator is likewise reduced and thus so is the power converted by the LED units. Besides temperature regulation, this measure also provides temperature shutdown if a predefinable maximum temperature is exceeded.

FIG. 1 shows in schematic illustration an exemplary embodiment of a circuit arrangement according to various embodiments. A power supply system AC voltage 701 is connected to two nodes 703 and 704 via a rectifier 702. The node 703 is connected to a node 759 via the series circuit formed by two resistors R1 and R2. The node 759 is coupled to the node 704 via the series circuit formed by three diodes D5, D6, D7 and an ohmic resistor R3, wherein the cathode of the diodes D5, D6, D7 faces in the direction of the node 704. The ohmic resistors R1, R2, the diodes D5, D6, D7 and the ohmic resistor R3 form a voltage divider, the tap of which constitutes the node 759.

The circuit arrangement furthermore includes a linear regulator 12 including two NPN transistors Q1, Q2 in a Darlington arrangement and also an ohmic resistor R5, which is coupled in series with said Darlington stage Q1, Q2. The base of the transistor Q2 constitutes the control terminal of the linear regulator 12 and is coupled to the node 759.

A series circuit formed by, in the present case, four LED units LE2, LE3, LE4 and a linear regulator 12 is coupled between the nodes 703 and 704. The construction of an LED unit is explained below on the basis of the example of the LED unit LE4, the construction of the LED units LE1, LE2 and LE3 being substantially identical and differing only in the number of the respective LEDs and the resultant dimensioning of the components.

The LED unit LE4 includes the LEDs D400 to D406, accordingly 7 LEDs, which are connected in series with one another and form an LED cascade. A diode D43 is coupled in series with the LED cascade, wherein the coupling point of the diode D43 and of the LED cascade constitutes a node N41. That terminal of the LED cascade which is not coupled to the diode D43 constitutes a node N42. That terminal of the diode D43 which is not coupled to the LED cascade constitutes a third node N43. An optional capacitor C43 can be coupled in parallel with the LED cascade. The series circuit formed by a capacitor C42 and a diode D42 is coupled between the node N43 and the node N42, wherein the coupling point of the capacitor C42 to the diode D42 constitutes a node N44.

The LED unit LE4 furthermore includes two electronic switches Q41 and B41, wherein the control electrode of the switch Q41 is coupled to a node N5 via the series circuit formed by a diode D41 and an ohmic resistor R41. The reference electrode of the switch Q41 is coupled to the node N44, while its operating electrode is coupled to the control electrode of the switch B41 via an ohmic resistor R42. The reference electrode of the switch B41 is coupled to the node N42, while its operating electrode is coupled to the node N43.

In the present exemplary embodiment, the switch B41 is realized as a Darlington stage and includes the transistors Q42, Q43 and also the ohmic resistors R43 and R44. However, an individual transistor could also be provided instead of the Darlington stage.

The LED units LE3, LE2, LE1 are constructed in a comparable manner, but each includes a different number of LEDs. Thus, the LED unit LE3 includes the LEDs D300 to D313, that is to say 14 LEDs. The LED unit LE2 includes the LEDs D200 to D227, that is to say 28 LEDs, and the LED unit LE1 includes the LEDs D100 to D155, that is to say 56 LEDs. As can clearly be discerned, the number of LEDs doubles from LED unit to LED unit proceeding from the lowest LED unit LE4 to the highest LED unit LE 1.

The second node of the lowest LED unit, in the present case the node N42, is coupled to the operating electrode of the linear regulator 12, while the third node N13 of the highest LED unit LE1 is coupled to the node 703. An auxiliary voltage source 14, which will be discussed in greater detail further below, is coupled between the node N5 and the linear regulator 12.

By way of example, the circuit arrangement illustrated in FIG. 1 has the following components and dimensionings: R1 75 kΩ, R2 500 kΩ, R3 2.5 kΩ, R5 10Ω, R11 200 kΩ, R21 100 kΩ, R31 50 kΩ, R41 25 kΩ, R12 1 mΩ, R22 500 kΩ, R32 250 kΩ and R42 125 kΩ. R13=R23=R33=R43 10 kΩ, R14=R24=R34=R44 1 kΩ, C12=470 nf, C22=1 µf, C32=1 µf, C42=1 µf, C13=22 µf, C23=47 µf, C33=100 µf and C43=220 µf, R4=5 kΩ, C2=22 µf.

The dimensionings of the capacitors C13, C23, C33 and C43 are comparatively large and these capacitors serve as buffer capacitor for the LEDs of the respective LED cascade. In this case, it is advantageous that these capacitors have to be designed only for the voltage dropped across the corresponding LED cascade, and therefore not for the full magnitude of the power supply system AC voltage V1. Accordingly, these capacitors can be embodied in a smaller fashion and thus in a manner that saves more space.

The diodes D11, D21, D32 and D41 are optional and can be omitted if the transistors Q11, Q21, Q31 and Q41 are designed with correspondingly high dielectric strength.

Within the voltage divider, the diode D7 is optional, and the diodes D5 and D6 serve to compensate for the base-emitter voltage of the transistors Q1 and Q2. The voltage dropped across the ohmic resistor R3 therefore substantially corresponds to the voltage dropped across the ohmic resistor R5. The current through the resistor R5 is accordingly half-sinusoidal. It follows from this that the current through the circuit arrangement follows the input voltage, thus resulting in a good power factor and low EMC interference.

What can be achieved by the dimensioning of the circuit arrangement shown in FIG. 1 is that the transistor B 11 is operated with a switching frequency of approximately 100 Hz. Flicker perceptible under certain circumstances on account of said switching frequency may be prevented by the assigned buffer capacitor C13. The transistor B21 operates with a switching frequency of approximately 200 Hz, the switch B31 with a switching frequency of approximately 400 Hz and the switch B41 with a switching frequency of approximately 800 Hz.

The combination of the capacitor C12 and the diode D12 constitutes a peak value detector for the LED unit LE1 including the LED cascade having the LEDs D100 to D155. Correspondingly, the capacitor C22 and the diode D22 constitute a peak value detector for the LED unit LE2, the capacitor C32 and the diode D32 constitute a peak value detector for the LED unit LE3, and the capacitor C42 and the diode D42 constitute a peak value detector for the LED unit LE4.

The transistors Q11, Q21, Q31 and Q41 act as comparators. The functioning is described by way of example below on the basis of the lowest LED unit LE4.

The resistor R42 is designed in combination with the capacitor C42 such that the capacitor C42 is discharged only slightly even during the longest expected switch-on phase of the switch B41. The voltage source 14 predefines a voltage offset as a minimum voltage, for example with a magnitude of 6 V, which should not be undershot at the switch Q1, Q2 of the linear regulator 12. The transistor Q41 compares the voltage 6 V with the voltage at the node N44. If the switch B41 turns on, then the LEDs D400 to D407 are bridged, that is to say short-circuited. This also shifts the operating points of the remaining driving units for the LEDs of the LED unit LE3, LE2 and LE1.

With regard to the functioning: The beginning of a half-cycle of the AC voltage source 701 is assumed hereinafter as the switch-on instant. It is furthermore assumed that all the switches of the LED units, that is to say the switches Q11, B11, Q21, B21, Q31, B31, Q41, B41, are conducting and all the capacitors are charged (settled state). The forward voltage of an LED is assumed to be 3 V, and that of a diode is assumed to be 0.7 V.

Owing to the switched-on switches, the instantaneous output voltage of the rectifier 702 at the node 703 is also present at the point N42. The nodes N42 and N43 are at the same potential since the switches Q42 and B41 were assumed to be conducting. The voltage provided at the nodes N5 by the auxiliary voltage source shall be assumed to be 6 V in various embodiments.

The capacitor C42 shall be charged to +21 V at the beginning of the half-cycle from the previous cycle. These 21 V result from 7 times the forward voltage of the diodes D400 to D406, wherein each forward voltage, as mentioned above, is assumed to be 3 V. A potential of –21 V thus arises at the node N44.

The node N5 is charged to 6 V by the auxiliary voltage source 14. This results in a current flow through the diode D41, the resistor R41 and the transistor Q41. The transistor Q41 is conducting since a potential of approximately 6 V is present at its base and a potential of approximately minus 21 V is present at its emitter. By virtue of the fact that the transistor Q41 is conducting, the switch B41 is also conducting. Accordingly, the current flows past the LED cascade of the LED unit LE4, that is to say that the LED cascade is short-circuited and not energized. As agreed, the switches B31, B21 and B11 are also conducting, and so the LED cascades of the LED units LE1, LE2 and LE3 are not energized either. This situation constitutes the starting point of a half-cycle of the rectified power supply system AC voltage V1.

The potential of the half-cycle rises in the further course of the half-cycle. On account of the thus increasing potential at the node 759, the linear regulator 12 gradually starts to become conducting.

As long as the switches Q41 and B41 are conducting, the potential at the node N43 is equal to the potential at the node N42. In the further course of the half-cycle, the potential at the node N43 rises until the potential at the node N44 is approximately 5.3 V (potential at the node N5 minus the forward voltage of the diode D41). At this instant, the base-emitter voltage of the transistor Q41 becomes 0 V. By virtue of the fact that 21 V are dropped across the capacitor C42, this is accordingly the case when the potential at the node N42 is 26.3 V. At this instant, the switches Q41 and B41 attain the off state, that is to say that the potentials at the nodes N43 and N42 are decoupled. The potential at the node N43 remains at 26.3 V.

Since the linear regulator 12, on account of corresponding driving by the voltage divider, wants to maintain the current flow through the ohmic resistor R5 in accordance with the stipulation of the voltage divider, the linear regulator 12 is increasingly switched on, as a result of which the potential at the node N42 falls until the desired current is set. This is the case when the voltage at the node N42 has fallen to 4.6 V. This value follows from the potential at the node N43, which, see above, after the switches Q41 and B41 have been switched off, is 26.3 V, minus 7 times the diode forward voltage of 3 V, minus 0.7 V for the forward voltage of the diode D43. This creates the prerequisite that the current flows via the LED cascade of the LED unit LE4, for which reason, starting from this instant, this cascade is luminous (provided that the optional capacitor C43 is absent; if it is present, the charging thereof has to be taken into consideration).

In the further course, the half-cycle rises further, as a result of which the potential at the node N43 increases further. Therefore, the potential at the node N42 also rises via the conducting LEDs D400 to D406. The voltage difference between the potential at the node N43 and at the node N42 is 26.3 V–4.6 V=21.7 V. The capacitor C32 is charged to 14×3 V=42 V (14 times the forward voltage of the diodes D300 to D313).

If the half-cycle rises to 26.7 V, these 26.7 V are present at the node N33 since all the switches Q21, B21, Q11 and B11 situated thereabove are switched on. The voltage at the node N34 is therefore 26.7 V 31 42 V=–15.3 V. Since the voltage at the node N5 is still 6 V, the switches Q31 and B31 are conducting. As the half-cycle continues to rise, the potential at the node N33 and thus the potential at the node N34 increase. If the potential at the node N34 has reached 5.3 V (potential at the node N5 of 6 V minus base-emitter voltage of the switch Q31), the switch Q31 and thus the switch B31 undergo transition to the off state. As the input voltage continues to rise, the potential at the node N33 rises further until 47.3 V is reached (5.3 V at the node N34 plus 14 times 3 V). This is the instant starting from which the current begins to flow via the LED cascade D300 to D313 of the LED unit LE3. At an input voltage of 47.3 V, therefore, 14 times 3 V plus 0.7 V (14 times the forward voltage of the LEDs D300 to D313 and the forward voltage of the diode D33) are dropped, such that the potential at the node N32 is only 4.6 V. Since the node N32 corresponds to the node N43, the potential at the node N43 is therefore also only 4.6 V. Accordingly, the potential at the node N44 is 4.6 V minus 21.0 V (corresponding to the potential at the node N43 minus the voltage dropped across the capacitor C42) equals minus 16.4 V. Therefore, the voltage difference between the node N5 and the node N44 is −22.4 V, as a result of which the transistor Q41 and thus the switch B41 become conducting again. In this way, the LED cascade D400 to D406 of the LED unit LE4 is short-circuited again, that is to say that it is no longer energized.

The LED cascades of the LED units LE2 and LE1 are energized in a corresponding manner

| Switching Operation | Cascade 1 | Cascade 2 | Cascade 3 | Cascade 4 |
|---|---|---|---|---|
| 1  | 0 | 0 | 0 | 0 |
| 2  | 0 | 0 | 0 | 1 |
| 3  | 0 | 0 | 1 | 0 |
| 4  | 0 | 0 | 1 | 1 |
| 5  | 0 | 1 | 0 | 0 |
| 6  | 0 | 1 | 0 | 1 |
| 7  | 0 | 1 | 1 | 0 |
| 8  | 0 | 1 | 1 | 1 |
| 9  | 1 | 0 | 0 | 0 |
| 10 | 1 | 0 | 0 | 1 |
| 11 | 1 | 0 | 1 | 0 |
| 12 | 1 | 0 | 1 | 1 |
| 13 | 1 | 1 | 0 | 0 |
| 14 | 1 | 1 | 0 | 1 |
| 15 | 1 | 1 | 1 | 0 |
| 16 | 1 | 1 | 1 | 1 |
| 17 | 1 | 1 | 1 | 1 |
| 18 | 1 | 1 | 1 | 0 |
| 19 | 1 | 1 | 0 | 1 |
| 20 | 1 | 1 | 0 | 0 |
| 21 | 1 | 0 | 1 | 1 |
| 22 | 1 | 0 | 1 | 0 |
| 23 | 1 | 0 | 0 | 1 |
| 24 | 1 | 0 | 0 | 0 |
| 25 | 0 | 1 | 1 | 1 |
| 26 | 0 | 1 | 1 | 0 |
| 27 | 0 | 1 | 0 | 1 |
| 28 | 0 | 1 | 0 | 0 |
| 29 | 0 | 0 | 1 | 1 |
| 30 | 0 | 0 | 1 | 0 |
| 31 | 0 | 0 | 0 | 1 |
| 32 | 0 | 0 | 0 | 0 |

If the half-cycle has exceeded its maximum, the opposite effect commences, that is to say that the LED cascades of the LED units LE1, LE2, LE3 and LE4 are successively switched in accordance with the above order until, at a phase angle of 180°, all the LED cascades are again bridged (B11 to B41 conducting) and a new half-cycle begins.

The following explanations concern a particularly advantageous realization for providing the potential at the node N5.

A buck converter is usually used for providing an auxiliary voltage, said buck converter being coupled to the output of the rectifier. According to various embodiments, however, the voltage drop at the linear regulator 12, that is to say the voltage at the node N42, is used for generating an auxiliary voltage for the node N5. On account of the binary design of the LED cascades, a sawtooth-like voltage can be tapped off at the linear regulator 12, said voltage fluctuating between 0 and 26.7 V until all the LED cascades are switched on. If all the LED cascades are activated, a voltage resulting from the difference between the input voltage and the sum of the voltages dropped across the LED cascades is dropped at the linear regulator. Since the voltage peaks of said sawtooth-like voltage are temporally distributed well within a half-cycle, said sawtooth-like voltage can be used to generate an auxiliary voltage by means of an RC element R4, C2 and rectifier and zener diodes D3, D2. Said auxiliary voltage has only little residual ripple, for which reason very small capacitances can be used in comparison with other auxiliary voltage supplies. It is constructed in a very simple manner and can be realized in a compact fashion. Moreover, it is also cost-effective for this reason. The fact that a current which otherwise would have been converted into power loss in the linear regulator 12 is drawn for the auxiliary voltage supply is particularly advantageous. Consequently, according to various embodiments, a parasitic power is used for generating the auxiliary voltage at the node N5. Consequently, the auxiliary voltage supply does not give rise to additional power loss, and the efficiency of the circuit arrangement is optimized.

Figure 2:
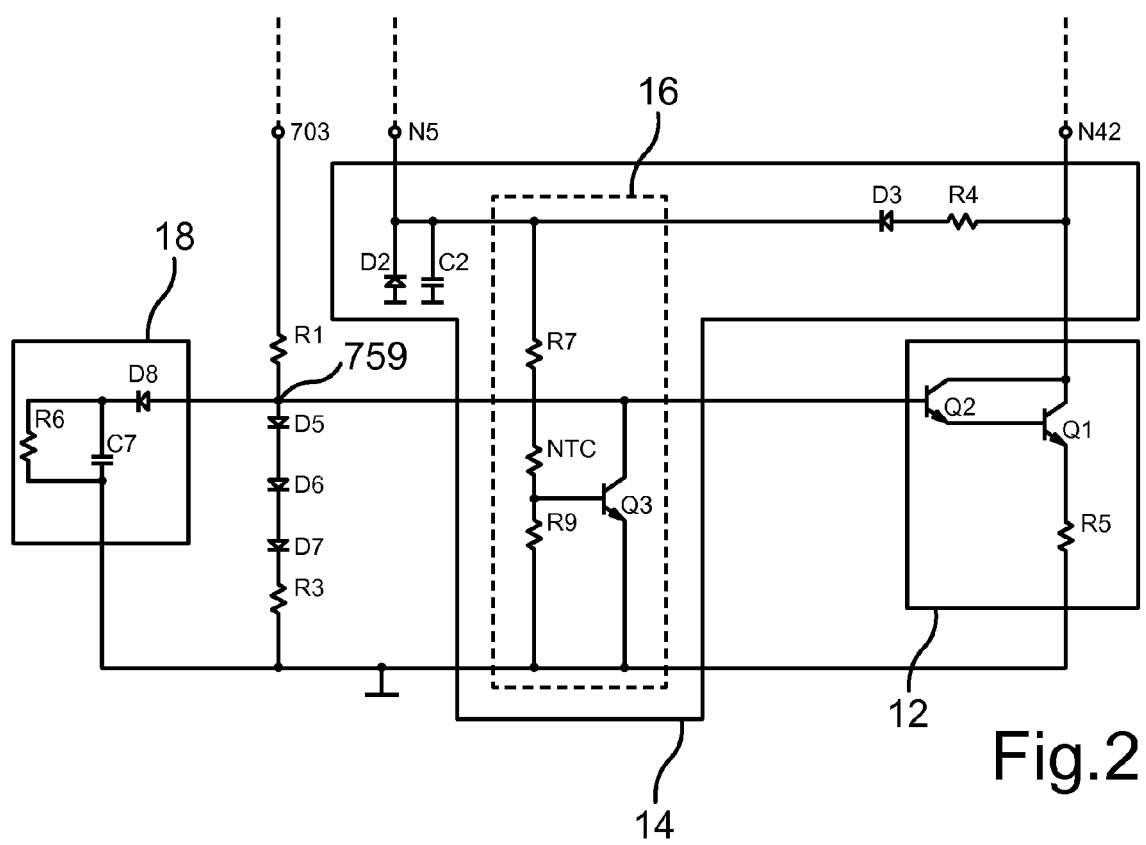
FIG. 2 shows in schematic illustration an alternative to a partial region of the circuit arrangement schematically illustrated in FIG. 1.

FIG. 2 shows an alternative embodiment of the auxiliary voltage supply 14. The latter furthermore includes a regulating device 16 for regulating the current through the linear regulator 12. The input of the regulating device 16 is coupled to the node N5, and the output is coupled to the control electrode of the switch Q2. The regulating device 16 includes a transistor Q3 and also a voltage divider including ohmic resistors R7 and R9 and an NTC thermistor. The tap of the voltage divider is coupled to the control electrode of the transistor Q3. The collector of the transistor Q3 is coupled to the control electrode of the switch Q2.

As soon as the temperature of the circuit arrangement rises, the transistor Q3 is increasingly switched on, as a result of which the switch Q1 increasingly undergoes transition to the off state. As a result, the current through the resistor R5 decreases, as a result of which the power converted in the LEDs is reduced. If the temperature becomes so high that the switch Q3 is fully switched on, a temperature shut down of the circuit arrangement is realized. The regulating device 16 is operated by means of the auxiliary voltage at the node N5.

FIG. 2 additionally shows a switch-on current delay including the diode D8 and also the parallel circuit formed by the capacitor C7 and the ohmic resistor R6. What is achieved thereby is that the voltage at the base of the transistor Q2 increases only slowly until the capacitor C7 has been charged to its peak value. This affords the advantage that an impermissibly high power loss does not occur in the transistor Q1 at the switch-on instant. It likewise makes it possible to operate a plurality of modules from a domestic fuse, without the latter tripping during switch-on.

In various embodiments, R9 is 500Ω, the NTC thermistor is 47 kΩ, R7 is 500Ω, R4 is 10 kΩ, C2 is 10 μf, C7 is 10 μf and R6 is 200 kΩ.

Figure 3:
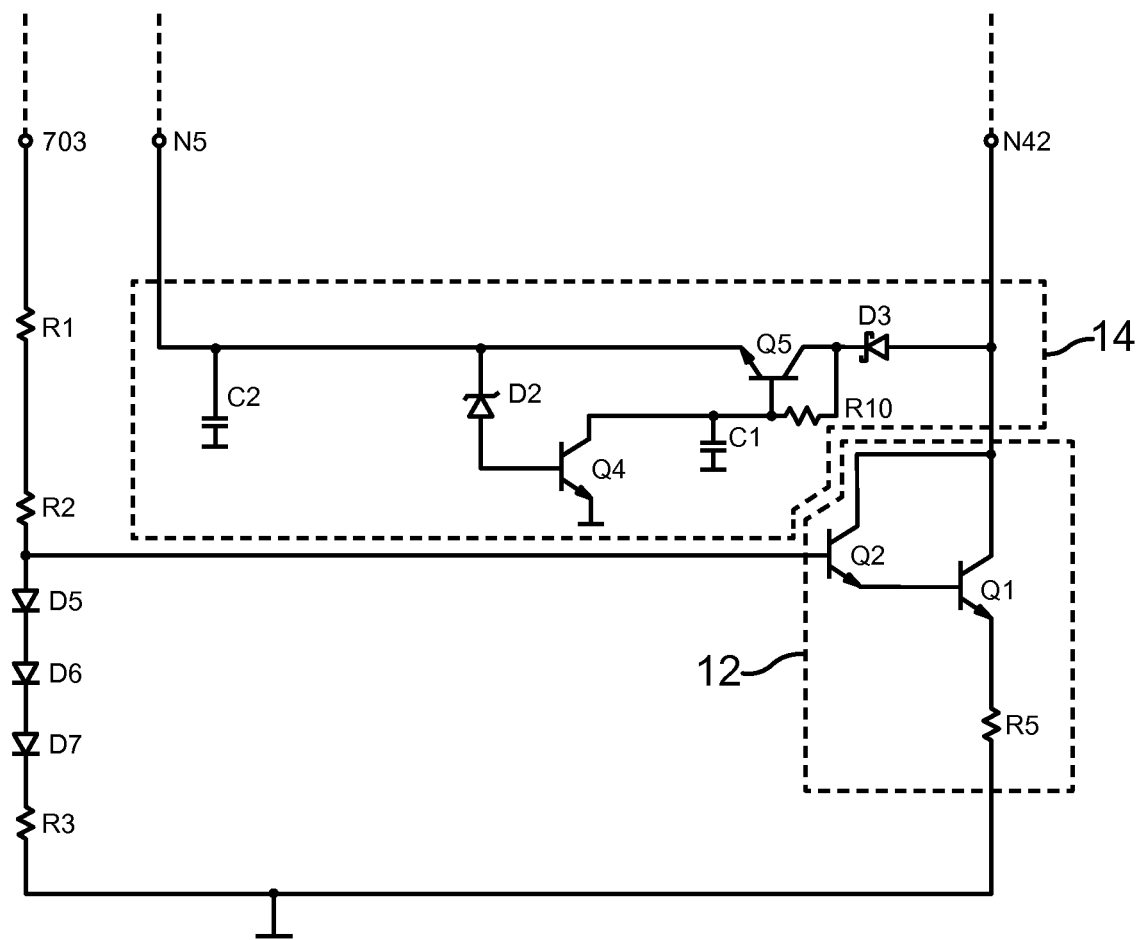
FIG. 3 shows in schematic illustration a further alternative to a partial region of the circuit arrangement schematically illustrated in FIG. 1.

FIG. 3 shows in schematic illustration a further alternative of a partial region of the circuit arrangement according to various embodiments as illustrated in FIG. 1. In various embodiments, the ohmic resistor R4, see FIG. 1, is embodied as a variable resistor, as a result of which regulation of the voltage at the node N5 is provided. As a result, the circuit arrangement can be used for dimmer operation. Specifically, in the case of phase-gating and phase-chopping dimmers, at the linear regulator 12 in some instances there is no longer enough voltage available to maintain the auxiliary voltage at the node N5. In order to rule this out, the ohmic resistor R4 for the auxiliary voltage supply would have to be chosen to be relatively small. This would have adverse effects on the circuit efficiency and the EMC performance.

In various embodiment illustrated in FIG. 3, therefore, an inverting voltage regulator is realized in the charge pump 14, said inverting voltage regulator enabling a higher efficiency of the circuit arrangement alongside the dimmability. The voltage regulator includes two electronic switches Q4, Q5 each having a control electrode, an operating electrode and a reference electrode. The control electrode of the switch Q4 is coupled to the anode of the zener diode D2, its reference electrode is coupled to the reference potential, in the present case to the second input terminal 704, and its operating electrode is coupled to the control electrode of the switch Q5. The control electrode of the switch Q5 is coupled via a pull-up resistor R10 to its operating electrode, which, for its part, is coupled to the cathode of the diode D3. Its reference electrode is coupled to the node N5. In order to improve the sensitivity of the circuit arrangement to interference, a capacitor C1 is provided, which is coupled between the control electrodes of the switches Q4 and Q5 and the reference potential.

With regard to the functioning: the switch Q4 measures the current through the zener diode D2, in which case, when the zener diode D2 is not in the on state, the voltage at the capacitor C2 is too low. By virtue of the fact that no current flows through the zener diode D2, the switch Q4 is turned off. Q5, when the voltage at its collector is higher than at the emitter, on account of the pull-up resistor R4, is turned on and thus supplies the capacitor C2 with charge carriers. The switch Q5 accordingly switches on if the voltage at the series regulator 12 is greater than the sum of the forward voltage of the diode D3, the base-emitter voltage of the switch Q5 and the voltage at the capacitor C2.

If the voltage at the capacitor C2 is sufficiently high, Q4 becomes conductive and thus extracts charge carriers from the base of the switch Q5.

In this way, even in the case of an asymmetrical, sawtooth-shaped voltage at the series regulator 12, as is the case in phase-gating and phase-chopping dimming, a constant voltage is provided at the node N5.

In various embodiments, R10 is 1 kΩ and C1 is 200 nF.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement for operating at least a first and a second cascade of LEDs comprising:
    an input having a first input terminal and a second input terminal for coupling to a rectified AC supply voltage;
    a linear regulator having an input; and
    at least one first higher and one second lower LED unit, wherein the first LED unit comprises the first cascade of LEDs and the second LED unit comprises the second cascade of LEDs;
    wherein the circuit arrangement furthermore comprises:
        a voltage divider, coupled between the first and the second input terminals, wherein the tap of the voltage divider is coupled to the input of the linear regulator;
    wherein each LED unit furthermore comprises:
        a first diode, which is coupled in series with the respective LED cascade, wherein the coupling point of the first diode and of the respective LED cascade constitutes a first node, wherein that terminal of the LED cascade which is not coupled to the first diode constitutes a second node, wherein that terminal of the first diode which is not coupled to the LED cascade constitutes a third node;
        the series circuit formed by a first capacitor and a second diode, which is coupled between the third node and the second node, wherein the coupling point of the first capacitor to the second diode constitutes a fourth node; and
        a first electronic switch and a second electronic switch each having a control electrode, a reference electrode and an operating electrode, wherein the control electrode of the first electronic switch is coupled to a fifth node, wherein the reference electrode of the first electronic switch is coupled to the fourth node, wherein the operating electrode of the first electronic switch is coupled to the control electrode of the second electronic switch, wherein the reference electrode of the second electronic switch is coupled to the third node, wherein the operating electrode of the second electronic switch is coupled to the second node;
    wherein the third node of the highest LED unit is coupled to the first input terminal, wherein the second node of the lowest LED unit is coupled to the linear regulator in such a way that the linear regulator is coupled in series between the second node of the lowest LED unit and the second input terminal;
    wherein the third node of a respective LED unit which does not constitute the highest LED unit is coupled to the second node of the next higher LED unit;
    wherein the fifth nodes of all the LED units are coupled to a DC voltage source;
    wherein the DC voltage source is realized by virtue of the fact that the AC voltage occurring at the second node of the lowest LED unit during the operation of the circuit arrangement is used for generating a DC voltage.

2. The circuit arrangement as claimed in claim 1, wherein each LED unit furthermore comprises a second capacitor, which is connected in parallel with the respective LED cascade.

3. The circuit arrangement as claimed in claim 1, wherein each LED unit furthermore comprises a third diode, which is coupled between the fifth node and the control electrode of the respective first electronic switch.

4. The circuit arrangement as claimed in claim 1, wherein the DC voltage source comprises a charge pump, the input of which is coupled to the second node of the lowest LED unit and the output of which is coupled to the fifth nodes of all the LED units.

5. The circuit arrangement as claimed in claim 4, wherein the charge pump comprises the series circuit formed by a half-wave rectifier and a voltage limiting device.

6. The circuit arrangement as claimed in claim 1, wherein the DC voltage source comprises the series circuit formed by an ohmic resistor and a fourth diode, which is coupled between the second node of the lowest LED unit and the fifth nodes of all the LED units, and the parallel circuit formed by a third capacitor and a zener diode, which is coupled between the fifth nodes of all the LED units and the second input terminal.

7. The circuit arrangement as claimed in claim 6, wherein the resistor connected in series with the fourth diode is embodied as a fixed ohmic resistor.

8. The circuit arrangement as claimed in claim 6,
wherein, for realizing a regulating device of the charge pump, the resistor connected in series with the fourth diode is embodied as a variable resistor.

9. The circuit arrangement as claimed in claim 8,
the regulating device of the charge pump is designed to regulate the voltage at the fifth node to a predefinable value.

10. The circuit arrangement as claimed in claim 8,
wherein the regulating device of the charge pump is embodied as an inverting voltage regulator.

11. The circuit arrangement as claimed in claim 8,
the regulating device of the charge pump comprises a third electronic switch and a fourth electronic switch each having a control electrode, an operating electrode and a reference electrode, wherein the control electrode of the third electronic switch is coupled to the anode of the zener diode, its reference electrode is coupled to the second input terminal and its operating electrode is coupled to the control electrode of the fourth electronic switch, wherein the control electrode of the fourth electronic switch is furthermore coupled via an ohmic resistor to its operating electrode, which, for its part, is coupled to the cathode of the fourth diode, wherein the reference electrode of the fourth electronic switch is coupled to the fifth node of all the LED units.

12. The circuit arrangement as claimed in claim 11,
wherein a capacitor is coupled between the control electrodes of the third electronic switch and of the fourth electronic switch, on the one hand, and the second input terminal, on the other hand.

13. The circuit arrangement as claimed in claim 1,
wherein the LED units each comprise a different number of LEDs.

14. The circuit arrangement as claimed in claim 13,
each higher LED unit comprises double the number of LEDs compared with the next lower LED unit.

15. The circuit arrangement as claimed in claim 1,
wherein a regulating device for regulating the current through the linear regulator is furthermore provided, wherein the input of the regulating device is coupled to the fifth node and the output of the regulating device is coupled to the input of the linear regulator.

16. The circuit arrangement as claimed in claim 15,
wherein the regulator device comprises:
    a fifth electronic switch having a control electrode, a reference electrode and an operating electrode; and
    a voltage divider having at least one ohmic resistor and an NTC thermistor, wherein the voltage divider is coupled between the fifth node and the second input terminal;
wherein the tap of the voltage divider is coupled to the control electrode of the fifth electronic switch, wherein the reference electrode of the fifth electronic switch is coupled to the second input terminal, wherein the operating electrode of the fifth electronic switch is coupled to the input of the linear regulator.

* * * * *

UNITED STATES PATENT AND TRADEMARK OFFICE
CERTIFICATE OF CORRECTION

PATENT NO.         : 9,095,021 B2                                    Page 1 of 1
APPLICATION NO.    : 13/886401
DATED              : July 28, 2015
INVENTOR(S)        : Andreas Seider It is certified that error appears in the above-identified patent and that said Letters Patent is hereby corrected as shown below:

In the claims

Column 8, line 60: Please delete "31" between the "V" and number "42" and write "-" in place thereof Signed and Sealed this
Fifteenth Day of March, 2016

Michelle K. Lee
*Director of the United States Patent and Trademark Office*